United States Patent [19]

Drake

[11] Patent Number: 5,347,434

[45] Date of Patent: Sep. 13, 1994

[54] AIRCRAFT BAG-RACK WITH AN ILLUMINATED HANDRAIL

[75] Inventor: Samuel M. Drake, Buena Park, Calif.

[73] Assignee: McDonnell Douglas Corporation, Long Beach, Calif.

[21] Appl. No.: 908,356

[22] Filed: Jul. 6, 1992

[51] Int. Cl.$^5$ .................. B60Q 1/00; B64D 47/02; B64D 11/00

[52] U.S. Cl. .................. 362/73; 362/61; 362/63; 362/147; 244/118.5; 244/119

[58] Field of Search .................. 362/73, 74, 62, 61, 362/63, 145, 146, 147, 155, 217, 218, 399; 244/118.5, 119, 129.1; 224/273, 282, 311, 323

[56] References Cited

U.S. PATENT DOCUMENTS

| | | | |
|---|---|---|---|
| 2,238,847 | 4/1941 | Dreyfuss | 362/74 |
| 2,582,738 | 1/1952 | Arenberg | 362/75 |
| 2,587,807 | 3/1952 | Arenberg et al. | 362/74 |
| 2,595,858 | 5/1952 | Kuhler | 105/329.1 |
| 3,035,161 | 5/1962 | Kalt | 362/74 |
| 3,569,689 | 3/1971 | Nestrock | 362/146 |
| 4,149,221 | 4/1979 | Eggert, Jr. | 362/73 |
| 4,161,769 | 7/1979 | Elliott | 362/146 |
| 4,574,336 | 3/1986 | Mikalonis | 362/74 X |
| 4,799,631 | 1/1989 | Humphries et al. | 105/337 |
| 4,907,762 | 3/1990 | Bock et al. | 244/118.1 |
| 5,129,597 | 7/1992 | Manthey et al. | 362/73 X |

FOREIGN PATENT DOCUMENTS 1125816   11/1956   France .................. 362/74

Primary Examiner—Larry Jones
Attorney, Agent, or Firm—Donald E. Stout; John P. Scholl

[57] ABSTRACT

A bag-rack mounted on an aircraft ceiling has a handrail secured to a recessed lower front portion thereof by a mount which also spaces the handrail from the bag-rack. The handrail is dimensionally shaped to conform to the inner surface contours of a user's hand and the recessed portion is curved to accommodate the back of the user's hand when reach into the recessed area to grip the handrail. The handrail also has an electroluminescent panel light mounted in a channel therein. The channel and light are positioned so that the light illuminates the recessed portion of the bag-rack and back-illuminates the handrail. The back-illumination of the handrail and the color contrast between the bag-rack and handrail provide visual differentiation between the handrail and bag-rack as well as other nearby structures enabling the user to more easily discern the handrail from other vehicle structures.

29 Claims, 3 Drawing Sheets

AIRCRAFT BAG-RACK WITH AN ILLUMINATED HANDRAIL

BACKGROUND OF THE INVENTION

The invention generally relates to vehicle bag-racks and handrails, and, more particularly, to aircraft bag-racks with a handrail attached thereto which is provided with a light for illuminating the front lower portion of the bag-rack and back-illuminating the handrail.

Many prior art designs for bag-racks having handrails attached thereto or proximal thereto are based more on esthetic considerations than pragmatic considerations. In such prior art structures, the bag-rack main body and the handrail are the same color and are shaped to visually blend together. Consequently, the handrail is not readily visually distinguishable from the bag-rack. Thus, the passenger cannot easily discern at a glance that a handrail is provided for his or her safety and convenience. In an emergency, being able to quickly spot a handrail may be crucial to the passenger's personal safety. Consequently, such prior art designs defeat an important purpose of providing a passenger handrail.

Prior art bag-racks having handrails associated therewith typically do not provide separate illumination of the handrail. Consequently, the handrails cannot be readily seen and visually distinguished from the bag-racks when the vehicle interior is generally dimly lit. Thus, under such conditions, a passenger may not be able to see the handrail and may, therefore, be prevented from being able to utilize the handrail in an emergency.

Many prior art designs for bag-racks having handrails utilize a cylindrical bar as the handrail. The cylindrical bar is typically of approximately a one inch diameter. Such relatively small diameter bars provide more of a finger grip than a full hand grasp. Consequently, such prior art handrails provide only a limited degree of stability and support to the user when walking or standing in the aisle of a vehicle.

Other prior art designs for bag-racks having handrails include a panel jutting out from the bag-rack main body and typically angled upward. The panel front portion serves as a handrail and provides generally opposing substantially flat surfaces. The user grips the panel with the front part of his or her fingers on the back surface and, if desired, the front portion of his or her thumb or palm on the front surface. Since a person's fingers are not typically very strong, such prior art handrails do not provide a high degree of stability and support to the user. In addition, dirt and trash tends to accumulate on the inner surfaces of such handrails requiring frequent cleaning thereof.

Thus, a bag-rack with a handrail is needed that can provide improved visual differentiation between the bag-rack and handrail in order to facilitate discernment of the handrail from the bag-rack and other vehicle structures. A bag-rack and handrail structure is also needed that allows a user to grasp the handrail with a full hand grasp so that it can provide more stability to the user. Furthermore, a bag-rack and handrail structure is needed in which desired portions thereof are more readily observable than other vehicle structures even in a generally dimly lit vehicle interior.

SUMMARY OF THE INVENTION

It is a principle object of the present invention to provide a bag-rack and handrail structure in which the handrail is visually prominent from other structures and thereby more readily observable by the user in order to enhance its effectiveness as a safety device.

It is another object of the present invention to provide a bag-rack and handrail structure in which the handrail accords full hand gripping thereof to the user in order to enhance its effectiveness as a safety device providing support and stability to the user.

It is another object of the present invention to provide a bag-rack and handrail structure having a sign mounted thereon which is easily viewable.

It is another object of the present invention to provide a bag-rack and handrail structure having natural color illumination thereof.

It is also another object of the present invention to provide a bag-rack and handrail structure adapted for use in a vehicle.

The bag-rack and handrail structure of the present invention is specifically designed for use in a vehicle such as an airliner (or other suitable aircraft), train, bus, etc. The structure of the invention is also specifically designed for mounting on an aircraft lateral frame structure or interior upper corner structure of the vehicle.

The structure of the invention provides a handrail which allows full hand gripping thereof enabling a firmer and more secure grip on the handrail for enhanced passenger safety. This improved grip feature allows the user to more easily brace himself against the handrail by using more of the available strength of his hand, arm and associated skeletal muscles. Thus, the user can utilize the handrail to pull and push his body as needed to stabilize himself while walking in the vehicle and while standing when the vehicle is in motion. The handrail is preferably shaped and contoured to generally conform to the shape of the inner surfaces of the user's hand when enclosing the handrail for full gripping thereof. The shaping and contouring of the handrail allows more of the hand's inner surfaces to be in contact with the handrail thereby affording a firmer and more secure grip thereof. Consequently, this feature provides an improved bracing and stabilizing structure for enhanced passenger safety and comfort.

The handrail is also back-illuminated and color contrasted from the bag-rack so that the user can more readily discern the handrail from other nearby structures. The back-illumination is provided by a light mounted on a back portion of the handrail. The back portion of the handrail faces a recessed surface of the bag-rack so that the light illuminates the recessed surface and reflected light therefrom back-illuminates the handrail making it visually stand out from both the illuminated bag-rack portion and other nearby structures.

A sign which may contain letters, numbers or international symbols identifying the vehicle seat or communicate other information may be placed on the recessed surface of the bag-rack. The light thus directly illuminates the sign facilitating clear viewing thereof. In addition, the recessed surface is angled so that the sign mounted thereon is not visually obstructed by the handrail. Consequently, the light provides improved observability of both the handrail and the sign.

Mounts placed at longitudinal ends of the handrail attach the handrail to the bag-rack and position the handrail relative to the bag-rack. In addition, the mounts space the handrail from the bag-rack a distance selected to allow the area between the handrail and bag-rack to accommodate a user's hand. This spacing thus allows the user to be able to more easily slip his hand in the area to grasp the handrail. The spacing also makes the handrail physically stand out from the bag-rack thereby enhancing the handrail's visual prominence and making it more readily observable. The visual prominence of the handrail makes it more likely that a passenger will be able to spot the handrail in an emergency situation in time to make full use of it to prevent personal injury. Thus, while other prior art bag-rack and handrail structures impede viewer discernment of the handrail from nearby structures due to cosmetic or esthetic concerns, the structure of the present invention enhances visual differentiation of the handrail and nearby structures for improved passenger safety.

From the foregoing, it is evident that a passenger can more easily brace and steady himself or herself by utilizing the handrail of the present invention while walking or standing in the vehicle. In addition, the present invention provides an illuminated and color contrasted structure which results in visual differentiation of the handrail from the bag-rack and other structures to enable the passenger to more quickly locate the handrail in an emergency.

DETAILED DESCRIPTION OF THE PREFERRED EMBODIMENT

Figure 1:
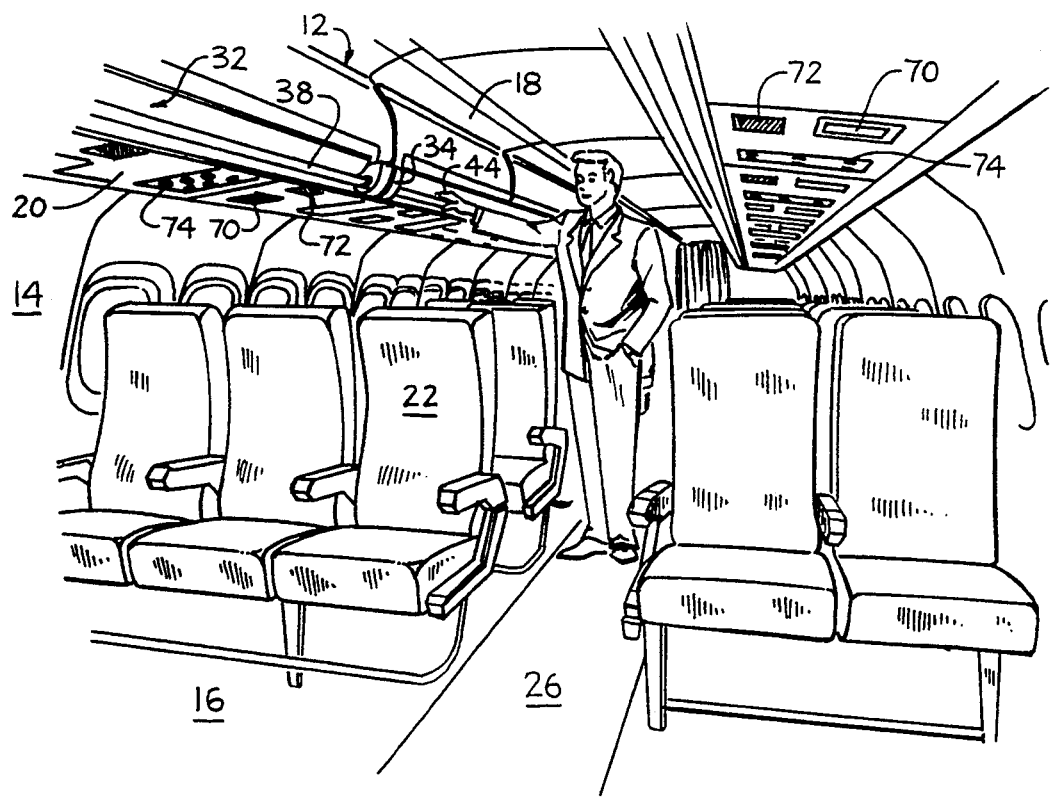
FIG. 1 is a perspective view of the bag-rack and handrail structure of the invention showing two rows of the structures mounted in a passenger cabin of an airliner and showing a passenger gripping the handrail.

Referring now to the drawings, the bag-rack and handrail of the invention is generally designated by the numeral 10. The structure 10 includes a bag-rack or other type of compartment 12 mounted in a passenger cabin 14 of an airliner 16 (or other suitable structure of another suitable type of vehicle). The bag-rack 12 preferably has an internal honeycomb structure 21 of lightweight construction. The bag-rack 12 is preferably mounted on an airframe hanger set point (or mount) 15 at preferably a lateral portion 17 of the cabin 14 and is preferably positioned so that an underside portion 20 is generally above and generally faces the passenger seats 22. A front portion 24 of the bag-rack 12 generally faces the aisle 26 and is generally perpendicular to the underside portion 20. The bag-rack 12 preferably has a generally raised upper portion 23 which allows it to generally conform to the dimensional shape of the ceiling 18.

The bag-rack 12 preferably has a recessed portion or recess 28 at a front lower portion (or corner portion) 30.

Figure 4:
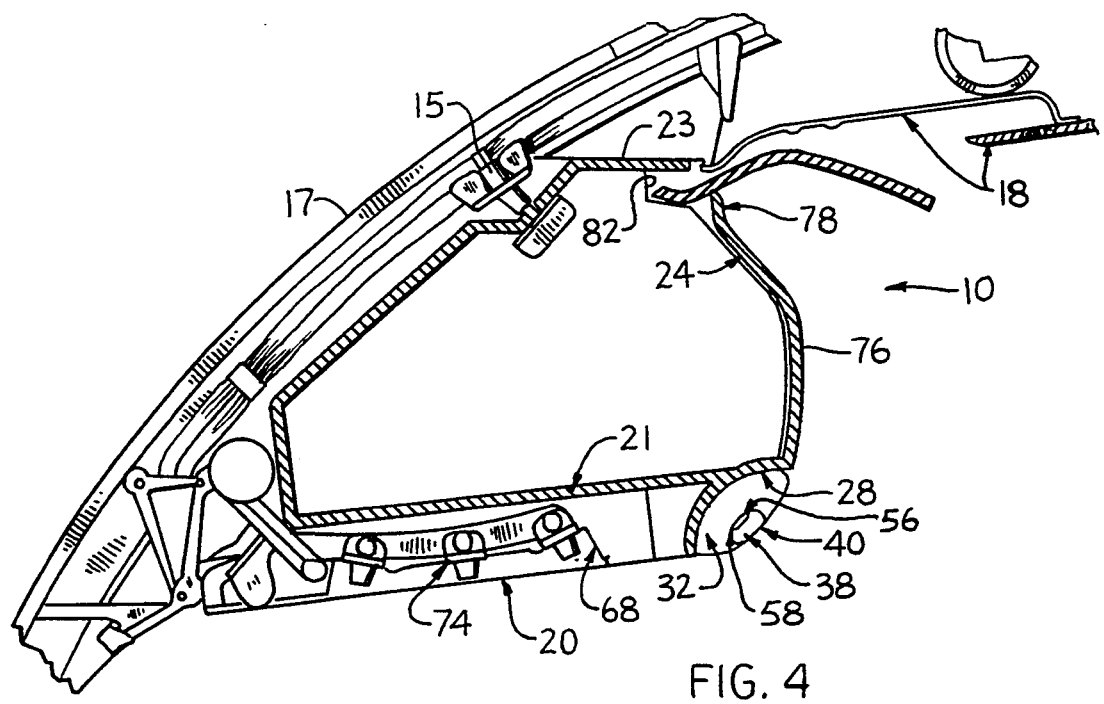
FIG. 4 is a cross-sectional view of the bag-rack and handrail structure of the invention mounted in a passenger cabin of an airliner and showing the component structures thereof.
Figure 5:
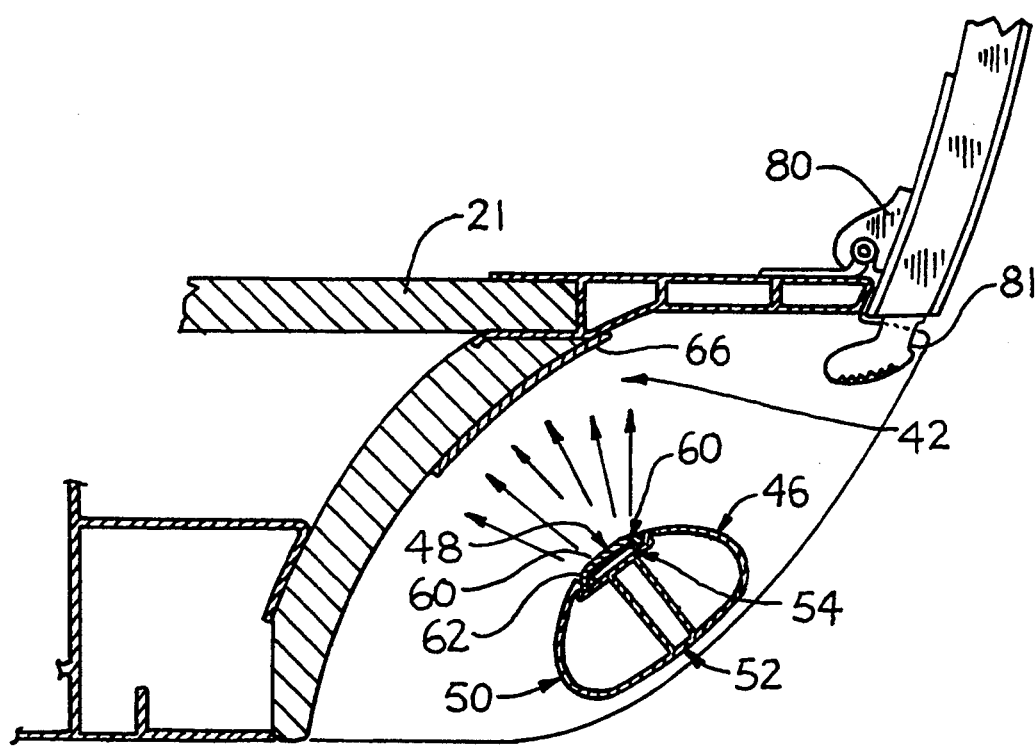
FIG. 5 is a cross-sectional view of a portion of the structure of the invention shown in FIG. 3 illustrating the component structures of the handrail and a front lower portion of the bag-rack in detail.

The recess 28 partly defines a recessed area 32, as shown in FIGS. 4 and 5.

Figure 2:
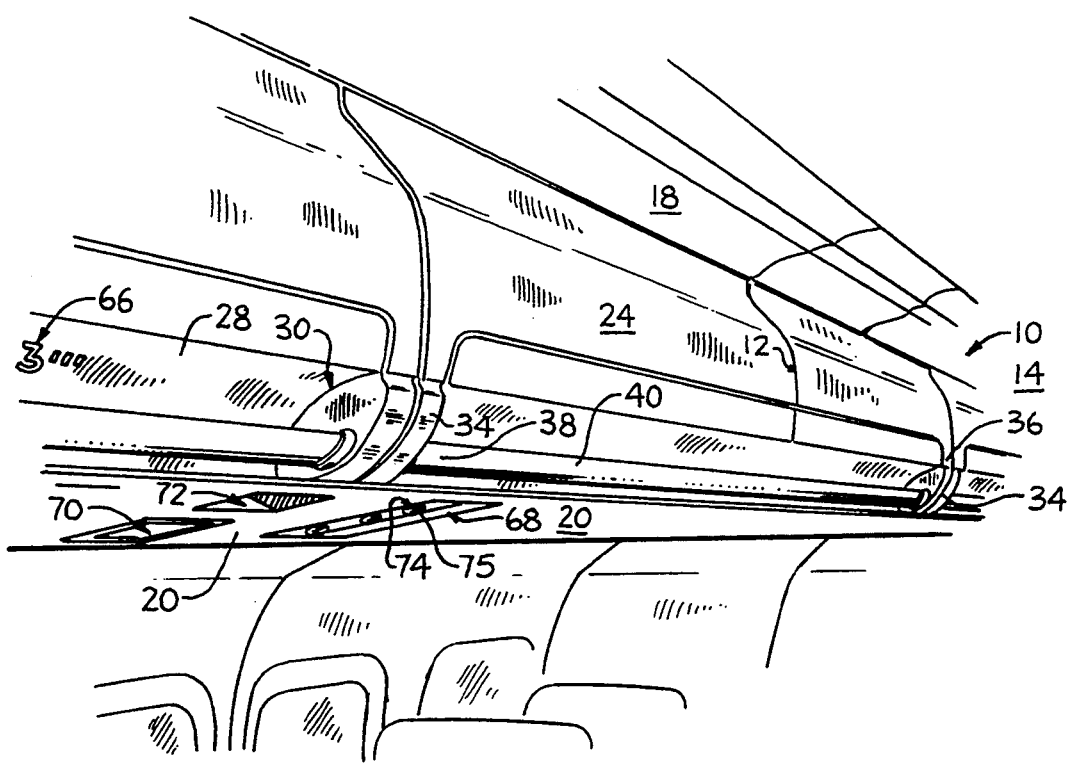
FIG. 2 is a perspective view of the bag-rack and handrail structure of the invention mounted in a passenger cabin of an airliner.
Figure 3:
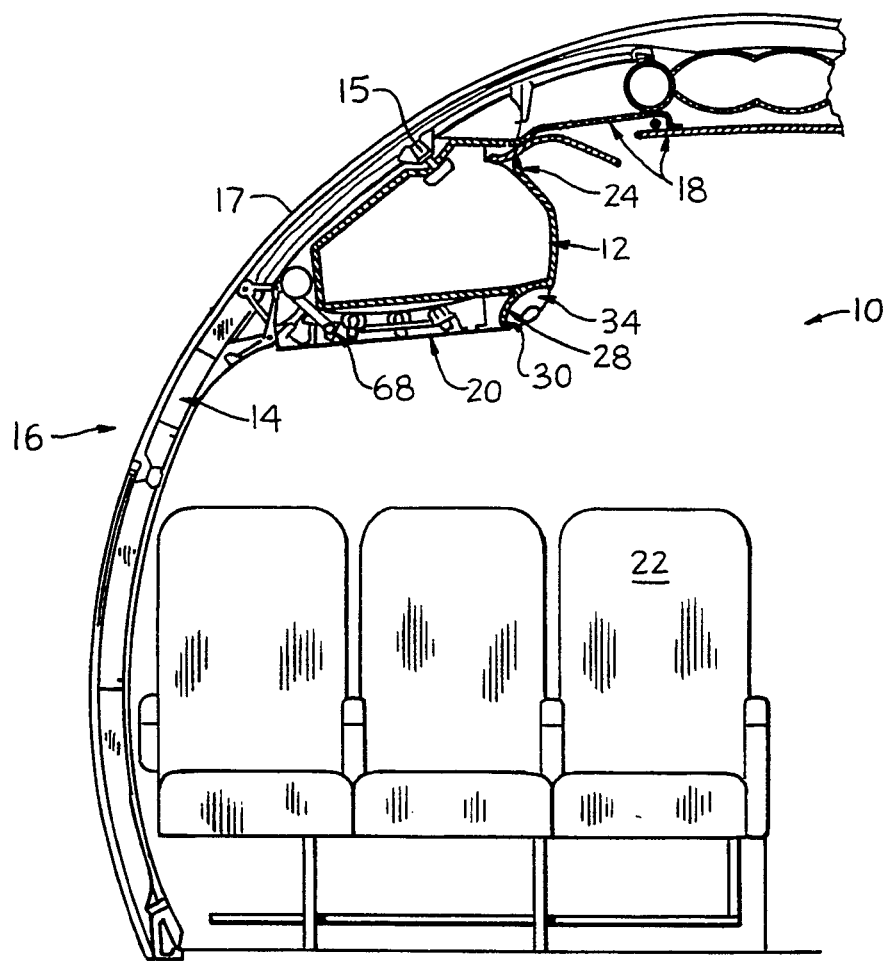
FIG. 3 is a cross-sectional view of the bag-rack and handrail structure of the invention also showing other passenger cabin structures in relation thereto.

The bag-rack 12 preferably has handrail mounts 34 which are preferably a pair of mounts 34 positioned at longitudinal end portions 36 of the front lower portion 30 of the bag-rack 12. Alternatively, in the case of a very long unitary bag-rack 12, the mounts 34 may be spaced at other desired locations of the front and lower portions 30. The mounts 34 preferably securely attach each longitudinal end 38 of the handrail 40 to the bag-rack 12, as shown in FIG. 2. The mounts 34 preferably also are dimensioned and positioned so that they space the handrail 40 a selected distance 42 from the front portion 30 of the bag-rack 12. The distance (or gap) 42 is selected so that it can accommodate a user's hand 44 therein when the user is reaching into the area 32 to grip the handrail. The distance 42 is thus wide enough to allow the thickest part of a user's hand to fit therein enabling the user to deftly and quickly reach into the area 32 and grip or grasp the handrail 40. The distance 42 is preferably approximately two inches.

The recess 28 preferably has a generally concave curvature. This curvature enables the recess to generally accommodate the back of the user's hand 44 when reaching into the area 32 and gripping the handrail 40.

The handrail is preferably dimensioned and shaped to generally fit the surface contours of the palm of a user's hand 44. This dimensioning and shaping enables the user's hand 44 to make generally full contact with the handrail 40 to provide more firm and secure gripping capability for the user. Consequently, this full hand contact feature allows the user to more easily use the handrail 40 to brace himself as well as push and pull himself as needed to stabilized himself while walking in the aisle or while the airliner is in motion. This unique feature is provided by the handrail's generally triangular cross sectional shape, as shown in FIG. 5. The corners 46, 48 and 50 are preferably rounded to more comfortably accommodate the contours of the inner surfaces of the user's hand 44. Specifically, the corner 48 is positioned so that it generally faces the recessed portion 28 and preferably generally makes contact with the inner surfaces of the user's knuckles when gripping the handrail 40. The corner 46 is positioned so that it preferably generally makes contact with the inner surfaces of the small joints of the user's hand 44 when gripping the handrail 40. The corner 50 is positioned so that it preferably generally makes contact with the inner surfaces of the joint of the forefinger and thumb of the user's hand 44. The front portion 52 of the handrail is preferably curved to generally accommodate the inner surfaces of the user's thumb when gripping the handrail 40 and the other portions between the corners 46 and 48 and the corners 48 and 50 are preferably also curved to generally accommodate the inner surfaces of the user's hand 44. In order to accommodate the user's hand 44, the handrail is cross-sectionally dimensioned so that it is approximately one and one-half inches thick at its thickest part i.e., from the corner 46 to the corner 50 and approximately one inch thick at its thinnest part i.e., from the corner 48 to the opposing curved surface 52 preferably at an approximately medial portion thereof. These dimensions also facilitate the handrail's capability of providing contact with generally the entire inner surfaces of the user's hand 44 when gripping the handrail 40.

The handrail 40 is preferably approximately level with the shoulders of a user who is approximately of average height. This enables the handrail 40 to afford more stability to the user. In addition, the recess 28 is preferably at a slope angle generally facing the torso of the user when standing erect in the aisle 26. This angular orientation of the recess 28 facilitates the user's reaching into the recess 28 to grasp the handrail 40.

The light 54 is preferably mounted at a back portion 56 of the handrail 40, as shown in FIG. 4. The light 54 is preferably generally embedded in the handrail 40 and more preferably mounted in a channel 58 in the back portion 56 and positioned therein so that it generally faces the recess 28 for illumination thereof. Light rays from the recess 28 thus illuminate the back portion 56 and back-illuminate the handrail 40. Back-illumination of the handrail 40 allows it to be visually differentiated from the recess 28 and bag-rack 12 because the front portion 52 is thereby dark relative to the recess 28. In addition, the handrail is preferably a different color than the recess 28 and the bag-rack 12 and this color difference adds to the visual differentiation between the handrail 40 and the recess 28 as well as the bag-rack 12. The handrail 40 is preferably gray, and the recess 28 is preferably a darker shade of gray than the handrail 40.

The light 54 is preferably an electroluminescent lamp and preferably a panel strip (approximately 0.040 inches in thickness) extending generally the entire longitudinal length of the handrail 40 up to the ends 38. The lamp 54 is preferably composed of aluminum foil covered with phosphorescent paint and includes conductor wire. The lamp 54 is preferably generally sealed so that it is impervious to water. The aluminum foil is a conductor of electricity and is electrically connected to the conductor wire thereby supplying electricity to the paint and turning the paint luminous.

A preferably transparent cover 60 is mounted on the back portion 56 and preferably covers the channel 58 as well as the light 54. The cover may be either transparent or translucent in order to let a desired degree of light from the lamp 54 pass therethrough. The cover 60 is also preferably mounted so that its outer surface 62 is generally flush with the surface 64 of back portion 56 and conforms to the cross-sectional dimensions and shape of the handrail 40 as set forth hereinabove. Since the cover 60 is generally flush with the handrail 40, it does not detract from the unitary feel of the handrail 40.

The handrail is preferably textured with a plastic laminate. However, other materials may also be suitable.

A sign 66 is preferably mounted on the bag-rack 12 preferably on the recessed portion 28 thereof, as shown in FIG. 4. The sign 66 is preferably illuminated by the lamp 54 and preferably positioned (preferably at a medial portion thereof) so that a user standing erect in the aisle 26 has an unobstructed view of the sign. The sign 66 may include letters, numbers or international symbols designating the seat row or it may communicate other information, as desired.

The bag-rack preferably has a switch panel (or personal service unit) 68 mounted on the underside portion 20, as shown in FIGS. 1 and 2. The switch panel (or control panel) 68 preferably includes switches 74 for the ventilation system, attendant call system, lights, etc. The control switches 74 are preferably concave, membrane type switches with a rubberized texture for better sensitivity. The switches 74 have a tactile feedback when activated so the user knows the switch is on or off. Switches 74 preferably also have LED lights therein for identification of the light functions. Switches preferably include a translucent material 75 embedded therein and in the shape of the communication symbols or letters identifying the switch functions. The translucent material 75 lets the LED light therethrough. In addition, a video monitor 70 and an audio speaker 72 are preferably mounted on the underside portion 20. Alternatively, the monitor 70 and speaker 72 may be mounted on the control panel 68.

The bag-rack 12 preferably also has a lid 76 mounted at preferably the front portion of the bag-rack 12. Lid 76 preferably includes two lids per bag-rack 12, as shown in FIGS. 1 and 2. The lid 76 has an end portion 78 which is preferably hingedly connected to the bag-rack 12 preferably at a notched portion 82 thereof for rotation if the lid about the axis at the end portion 78 in order to enable the user to open and close the bag-rack 12, as desired. A latch 80 is also preferably provided to lock the lid 76 in the closed position. The latch 80 preferably includes a latch tip 81 which preferably positioned approximately one-half inch below the lower edge of the lid 76 and at an approximately medial portion thereof, as shown in FIGS. 1 and 2.

Accordingly, there has been provided, in accordance with the invention, a vehicle bag-rack and full grip handrail structure which provides visual differentiation between the handrail and the bag-rack as well as other nearby structures for improved safety. It is to be understood that all the terms used herein are descriptive rather than limiting. Although the invention has been described in conjunction with the specific embodiment set forth above, many alternative embodiments, modifications, and variations will be apparent to those skilled in the art in light of the disclosure set forth herein. Accordingly, it is intended to include such alternatives, embodiments, modifications and variations that fall within the spirit and scope of the invention as set forth in the claims hereinbelow.

What is claimed is:

1. A combination compartment and handrail structure for a vehicle, comprising:
    a compartment mounted on a vehicle structure;
    a handrail providing generally full hand gripping thereof by a user;
    a means for mounting said handrail on said compartment at a desired position relative to said compartment; and
    a light, forming a part of said handrail about which the user may extend a full hand grip and illuminating at least a portion of said compartment and a desired portion of said handrail said compartment and handrail mounted generally along the length of said vehicle.

2. A combination of claim 1 wherein said compartment includes a recess at generally a front lower portion thereof for receiving said handrail in an area partly defined by the recess.

3. The combination of claim 2 further including a sign mounted at a front surface portion of said recess, said sign positioned for illumination by said light and for unobstructed viewing by the user.

4. The combination of claim 1 wherein said means mounts the handrail at the desired position in which it is spaced from said compartment a distance sufficient to enable the user's fingers and knuckles to fit between said compartment and said handrail.

5. The combination of claim 1 wherein said handrail has a generally triangular cross-sectional shape with triangle corners thereof generally rounded off to generally conform to the shape of inner surfaces of the user's hand when gripping said handrail.

6. The combination of claim 5 wherein one of said triangle corners is generally facing an adjoining medial portion of said compartment.

7. The combination of claim 5 wherein said handrail has cross-sectional dimensions so that one of said triangle corners is generally in contact with inner surfaces of the user's knuckles, another of said corners is generally in contact with the inner surfaces of the user's finger small joints and the other of said corners is generally in contact with the inner surfaces of the user's thumb and forefinger joint to generally conform to the shape of inner surfaces of the user's hand when gripping said handrail.

8. The combination of claim 1 wherein said handrail has a color contrasting it from said compartment to facilitate discernment therefrom by the user.

9. The combination of claim 1 wherein said handrail is positioned so that it is approximately level with the head of the user when standing erect.

10. The combination of claim 1 wherein said light is positioned at a back portion of said handrail so that unreflected light emitted therefrom generally only illuminates said compartment.

11. The combination of claim 1 wherein said light is mounted on an interior portion of said handrail.

12. The combination of claim 11 further including a transparent cover mounted on a back portion of said handrail, said cover generally covering said light, said cover generally flush with a back surface portion of said handrail to enhance user comfort when gripping said handrail.

13. The combination of claim 1 wherein said light is electroluminescent..

14. The combination of claim 1 wherein said light is a panel strip.

15. The combination of claim 1, wherein said handrail has a cross-sectional dimension ranging between approximately one inch at its thinnest part to approximately one and one half inch at its thickest part.

16. A combination bag-rack and handrail structure for an aircraft interior, comprising:
   a bag-rack mounted on an aircraft interior structure and forming a compartment between the bag-rack and the interior structure;
   a handrail providing generally full hand gripping thereof by a user;
   means for securely mounting said handrail on said bag-rack at a position relative thereto in which said handrail is spaced a desired distance from said bag-rack; and
   a light, forming a part of said handrail about which the user may extend a full hand grip and, said light positioned so that it generally faces said compartment for illuminating said compartment and a desired portion of said handrail said bag-rack and handrail mounted generally along the length of the vehicle.

17. The combination of claim 16 wherein said bag-rack includes a recess at generally a front lower portion thereof for receiving said handrail in an area partly defined by the recess, the recess having a curvature for generally accommodating the user's hand when gripping said handrail.

18. The combination of claim 17 further including a sign mounted at a front surface portion of said recess, said sign positioned for illumination by said light and for generally unobstructed viewing by the user.

19. The combination of claim 16 wherein said means mounts the handrail at the desired distance from the bag-rack, the distance sufficient to enable the user's fingers and knuckles to fit between said bag-rack and said handrail.

20. The combination of claim 16 wherein said handrail has a generally triangular cross-sectional shape with triangle corners thereof generally rounded off to generally conform to the shape of inner surfaces of the user's hand when gripping said handrail.

21. The combination of claim 20 wherein one of said triangle corners generally faces an adjoining medial portion of said compartment and said handrail has cross-sectional dimensions which enable one of said triangle corners to be generally in contact with inner surfaces of the user's knuckles, another of said corners to be generally in contact with inner surfaces of the user's finger small joints and the other of said corners to be generally in contact with inner surfaces of the user's thumb and forefinger joint for generally conforming said handrail to the shape of inner surfaces of the user's hand when gripping said handrail.

22. The combination of claim 16 wherein said handrail has a color selected for contrasting said handrail from said compartment to facilitate discernment thereof by the user.

23. The combination of claim 16 wherein said handrail is positioned so that it is approximately level with the shoulders of the user when standing erect.

24. The combination of claim 16 wherein said handrail has a channel at a back portion thereof, said light mounted in the channel and positioned so that unreflected light emitted therefrom generally only illuminates said compartment and light emitted therefrom which is reflected from said compartment generally back-illuminates said handrail.

25. The combination of claim 24 further including a transparent cover mounted on said handrail and positioned over the channel to generally cover said light, said cover generally flush with adjoining surface portions of said handrail to enhance user comfort when gripping said handrail.

26. The combination of claim 16 wherein said light is an electroluminescent panel strip.

27. A combination bag-rack and handrail structure for an aircraft interior, comprising:
   a bag-rack mounted on an aircraft interior structure, said bag-rack having a recess at a lower front portion thereof;
   a lid hingedly connected to said bag-rack for selectively providing user access thereto;
   a handrail having a channel at a back portion thereof and having a generally triangular cross-sectional shape, one of the triangle corners generally rounded off, said handrail having cross-sectional dimensions selected to enable said one of the triangle corners to be generally in contact with inner surfaces of the user's knuckles and another of the triangle corners to generally in contact with the inner surfaces of the user's finger small joints and the other of the triangle corners to be generally in contact with inner surfaces of the user's thumb and forefinger joint when gripping said handrail in order to provide full hand gripping thereof by a user;

means for mounted said handrail on said bag-rack in an area partly defined by said recess at a position in which said handrail is spaced from the recess a distance selected to enable the user's fingers and knuckles to fit between said handrail and recess when gripping said handrail;

an electroluminescent panel strip light mounted in the channel and positioned so that said light generally faces the recess in order that unreflected light emitted therefrom generally only illuminates said bag-rack and light emitted therefrom which is reflected from the recess back-illuminates said handrail.

28. The combination of claim 27 wherein the recess has a slope angle selected so that the recess generally faces the torso of the user when standing erect and gripping said handrail.

29. The combination of claim 27 further including a transparent cover mounted on said handrail and positioned over the channel to generally cover said light, said cover generally flush with adjoining surface portions of said handrail.

* * * * *